(12) United States Patent
Boutaghou et al.

(10) Patent No.: US 7,417,828 B2
(45) Date of Patent: Aug. 26, 2008

(54) BI-LEVEL CAVITY FOR A SLIDER AIR-BEARING SURFACE

(75) Inventors: Zine Eddine Boutaghou, Vadnais Heights, MN (US); Scott E. Ryun, Prior Lake, MN (US); Anthony P. Sannino, Longmont, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 1055 days.

(21) Appl. No.: 09/897,779

(22) Filed: Jun. 29, 2001

(65) Prior Publication Data

US 2002/0048120 A1  Apr. 25, 2002

Related U.S. Application Data

(60) Provisional application No. 60/217,528, filed on Jul. 11, 2000.

(51) Int. Cl.
*G11B 5/60* (2006.01)
(52) U.S. Cl. .................................. 360/235.5
(58) Field of Classification Search ............. 360/234.7, 360/235.5–236.4
See application file for complete search history.

(56) References Cited

U.S. PATENT DOCUMENTS

| | | | |
|---|---|---|---|
| 4,212,044 A | 7/1980 | Plotto | 360/103 |
| 4,553,184 A | 11/1985 | Ogishima | 360/103 |
| 4,636,894 A | 1/1987 | Mo | 360/103 |
| 4,646,180 A | 2/1987 | Ohtsubo | 360/103 |
| 4,757,402 A | 7/1988 | Mo | 360/103 |
| 4,802,042 A | 1/1989 | Strom | 360/103 |
| 4,961,121 A | 10/1990 | Astheimer et al. | 360/103 |
| 5,200,868 A | 4/1993 | Chapin et al. | 360/103 |
| 5,345,353 A | 9/1994 | Krantz et al. | 360/103 |
| 5,404,256 A * | 4/1995 | White | 360/236.3 |
| 5,572,386 A | 11/1996 | Ananth et al. | 360/103 |
| 5,742,518 A | 4/1998 | Giu et al. | 364/508 |
| 5,751,517 A | 5/1998 | Agarwal | 360/103 |
| 5,841,608 A | 11/1998 | Kasamatsu et al. | 360/103 |
| 6,188,547 B1 | 2/2001 | Gui et al. | 360/236.5 |
| 6,459,546 B1 * | 10/2002 | Mundt et al. | 360/236.3 |
| 6,628,480 B2 * | 9/2003 | Kohira et al. | 360/235.6 |

* cited by examiner

Primary Examiner—A. J. Heinz

(57) ABSTRACT

An information handling system, such as a disc drive, including a base, a disc stack rotatably attached to the base, and an actuator assembly movably attached to the base. The actuator assembly also includes a load spring and a slider attached to said load spring. The slider has an air-bearing surface. The air-bearing surface includes a first rail, a second rail and a depression positioned between the first rail and the second rail of the air-bearing surface. The depression further includes a first level surface and a second level surface. The first level surface of the slider is at a different distance from a surface of the first rail of the slider than the second level surface of the slider. The air-bearing surface may also include a divider located between the first level surface of the slider and the second level surface of the slider.

21 Claims, 6 Drawing Sheets

BI-LEVEL CAVITY FOR A SLIDER AIR-BEARING SURFACE

RELATED APPLICATION

This application claims the benefit of U.S. Provisional Application Ser. No. 60/217,528 filed on Jul. 11, 2000, under 35 USC119(e).

FIELD OF THE INVENTION

The present invention relates to the field of mass storage devices. More particularly, this invention relates to a disc drive which includes a slider having a two-level cavity between the rails of an air-bearing surface.

BACKGROUND OF THE INVENTION

One of the key components of any computer system is a place to store data. One common place for storing data in a computer system is on a disc drive. The most basic parts of a disc drive are a disc that is rotated, an actuator that moves a transducer to various locations over the disc, and electrical circuitry that is used to write and read data to and from the disc. The disc drive also includes circuitry for encoding data so that it can be successfully retrieved and written to the disc surface. A microprocessor controls most of the operations of the disc drive as well as passing the data back to the requesting computer and taking data from a requesting computer for storing to the disc. The magnetic transducer translates electrical signals into magnetic field signals that actually record the data "bits."

The transducer is typically housed within a small ceramic block called a slider. The slider is passed over the rotating disc in close proximity to the disc. The transducer can be used to read information representing data from the disc or write information representing data to the disc. When the disc is operating, the disc is usually spinning at relatively high revolutions per minute ("RPM"). A current common rotational speed is 7200 RPM. Rotational speeds in high-performance disc drives are as high as 15,000 RPM. Higher rotational speeds are contemplated for the future.

The slider is usually aerodynamically designed so that it flies on the cushion of air that is dragged by the disc. The slider has an air-bearing surface ("ABS") which includes rails and a cavity or depression between the rails. The air-bearing surface is that surface of the slider nearest the disc as the disc drive is operating. Air is dragged between the rails and the disc surface causing an increase in pressure which tends to force the head away from the disc. Simultaneously, air rushing past the cavity or depression in the air-bearing surface produces a lower than ambient pressure area within the cavity or depression. This sub-ambient pressure counteracts the pressure produced at the rails. The opposing forces equilibrate so the slider flies over the surface of the disc at a particular fly height. The fly height is the thickness of the air lubrication film or the distance between the disc surface and the transducing head. This film minimizes the friction and resulting wear that would occur if the transducing head and disc were in mechanical contact during disc rotation.

Information representative of data is stored on the surface of the memory disc. Disc drive systems read and write information stored on tracks on memory discs. Transducers, in the form of read/write heads attached to the sliders, located on both sides of the memory disc, read and write information on the memory discs when the transducers are accurately positioned over one of the designated tracks on the surface of the memory disc. The transducer is also said to be moved to a target track. As the memory disc spins and the read/write head is accurately positioned above a target track, the read/write head can store data onto a track by writing information representative of data onto the memory disc. Similarly, reading data on a memory disc is accomplished by positioning the read/write head above a target track and reading the stored material on the memory disc. To write on or read from different tracks, the read/write head is moved radially across the tracks to a selected target track. The data is divided or grouped together on the tracks. In some disc drives, the tracks are a multiplicity of concentric circular tracks. In other disc drives, a continuous spiral is one track on one side of a disc drive. Servo feedback information is used to accurately locate the transducer. The actuator assembly is moved to the required position and held accurately during a read or write operation using the servo information.

The best performance of the disc drive results when the slider is flown as closely to the surface of the disc as possible. In operation, the distance between the slider and the disc is very small; currently "fly" heights or head media spacing is about 0.5-1 micro inches. The constant demand for increasing hard drive recording density has resulted in a drastic decrease in head media spacing (HMS) over the years. Variation in the HMS of fly height due to altitude or manufacturing variation-induced fly loss, is now an increasing source of problems due to head/media intermittent contact, especially at sub half-micro inch fly height. Intermittent contact induces vibrations detrimental to the reading/writing quality at such low fly height. Intermittent contacts may also eventually result in a head crash and total loss of data, which, of course, is very undesirable.

Slider air bearings possess three degrees of freedom; namely vertical motion, pitch rotation and roll rotation. Associated with the three degrees of freedom are three applied forces, a pre-load force imposed by the gimbal, an air-bearing suction force, and an air-bearing lift force. Steady state fly altitude of the entire slider is achieved when these three forces balance each other. Previous studies have shown a strong relationship between suction force center position and altitude sensitivity. On the one hand, lower ambient pressure will generate both loss from lift force and suction force but by different amounts, thereby having the slider reaching equilibrium with the pre-load force at lower or higher overall fly height. On the other hand, the component that will dictate the actual PTFH (pole tip fly height) loss or gain, is rotation of the slider around the pivot point (Xcg) (See FIG. 5 which is a free body diagram of slider with forces). It is generally acknowledged that the closer the suction force center is towards the leading edge (Xn<Xcg, FIG. 1), the more pitch variation that occurs when the suction force is lost or varies. Simply put, the loss of suction rotates the slider counter clockwise in the pitch direction and makes the fly loss worse. On the other hand, rotating the slider clockwise and compensation of the global fly loss can be achieved with Xn>Xcg, even to a point where PTFH can increase with altitude.

What is needed is a slider air-bearing design for low altitude sensitivity. What is also needed is a design for controlling suction force center location. However, this has to be achieved without decreasing lift and suction magnitude, which could degrade other performance characteristics such as bearing stiffness and manufacturing sensitivity.

SUMMARY OF THE INVENTION

An information handling system, such as a disc drive, includes a base, a disc stack rotatably attached to the base, and an actuator assembly movably attached to the base. The actuator assembly also includes a load spring and a slider attached to said load spring. The slider has an air-bearing surface. The air-bearing surface includes a first rail, a second rail and a depression positioned between the first rail and the second rail of the air-bearing surface. The depression further includes a first level surface and a second level surface. The first level surface of the slider is at a different distance from a surface of the first rail of the slider than the second level surface of the slider. The air-bearing surface may also include a divider located between the first level surface of the slider and the second level surface of the slider. The divider extends to the level of the first rail of the slider. In some embodiments, the air-bearing surface of the slider may further include a third level surface and a second divider positioned between the second level surface of the slider and the third level surface of the slider. The location where the suction control force acts on the slider can be controlled by varying the area of the first level surface of the slider and the area of the second level surface of the slider.

A slider for a disc drive includes an air-bearing surface which has a first rail, a second rail, and a cavity positioned between the first rail and the second rail. The cavity has a first level surface and a second level surface. The first level surface is at a different distance from a surface of the first rail than the second level surface. The air-bearing surface also has a divider between the first level surface and the second level surface. The divider extends to the level of the first rail. In one embodiment, the air-bearing surface of the slider includes a third level surface. The air-bearing surface may include a first divider between the first level surface and the second level surface, and a second divider positioned between the second level surface and the third level surface. In another embodiment, the cavity between the first rail and the second rail slopes to provide a cavity having a first surface level and the second surface level. The slope of the cavity surface slopes with respect to a surface of the first rail. The slope can be varied to control the location at which a suction force acts on the slider. In the alternative, the area of the first level surface and the area of the second level surface can be varied to control the location at which a suction control force acts on the slider. The depth of the first level surface and the depth of the second level surface can also be varied to control the location at which a suction control force acts on the slider. In other words, both the area and depth of the first level surface and the area and depth of the second level surface can be varied to control the location at which a suction control force acts on the slider.

Advantageously, slider having an air-bearing surface with at least two levels within the cavity or depression allows for an apparatus for controlling the amount of fly height variance associated with the slider. Additional levels can also be incorporated by a skilled designer to obtain the desired effect. Since the fly height variance is controlled, the incidence of contact between the slider and the disc surface can be also be controlled. In other words, the slider air-bearing design having at least a two level cavity or depression has low altitude sensitivity. The design also allows for controlling the location of the suction force center where the suction force acts on the slider. In addition, this is achieved without decreasing lift and suction magnitude, which would, possibly, degrade other performance characteristics such as bearing stiffness and manufacturing sensitivity.

DESCRIPTION OF THE PREFERRED EMBODIMENT

In the following detailed description of the preferred embodiments, reference is made to the accompanying drawings which form a part hereof, and in which are shown by way of illustration specific embodiments in which the invention may be practiced. It is to be understood that other embodiments may be utilized and structural changes may be made without departing from the scope of the present invention.

Figure 1:
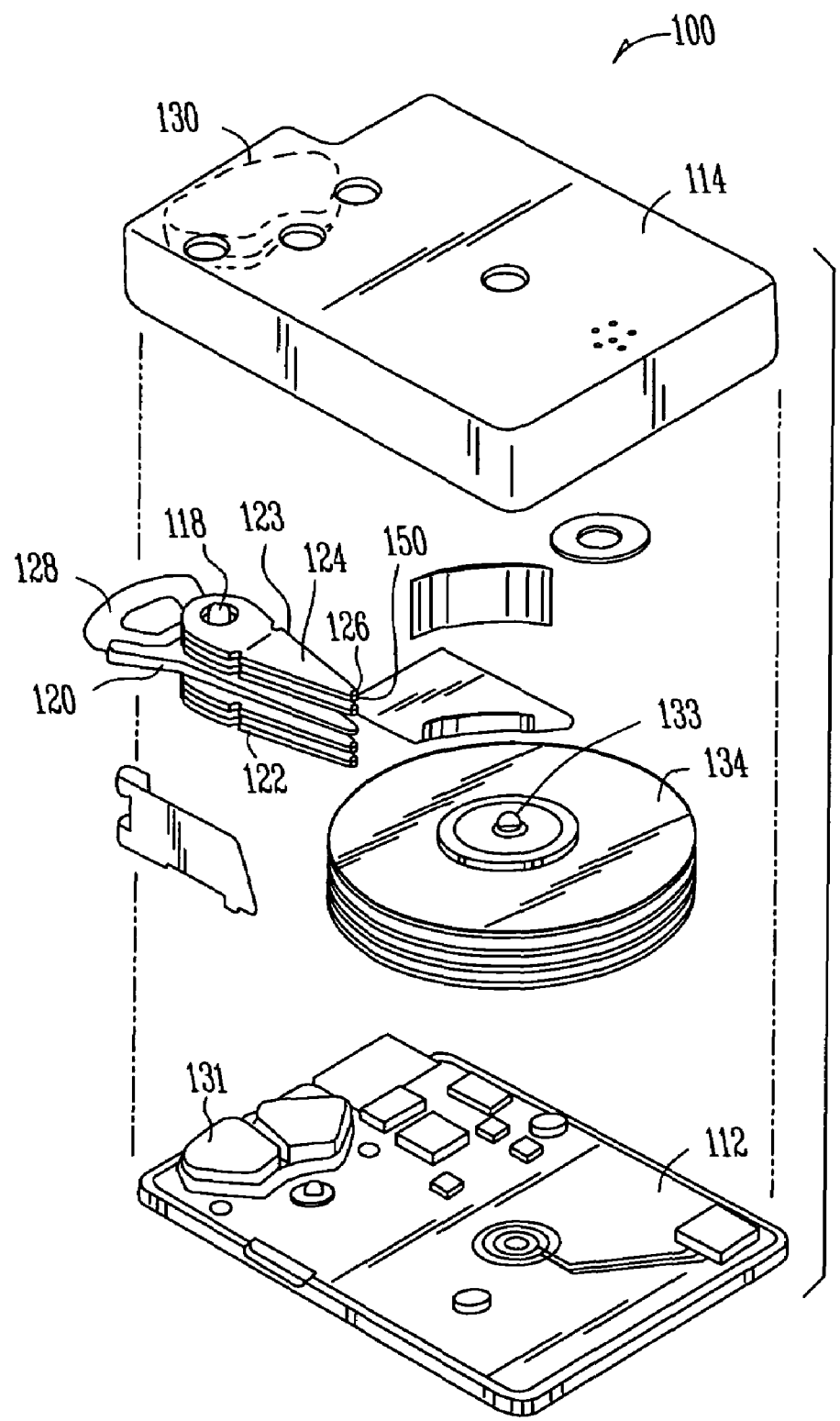
FIG. 1 is an exploded view of a disc drive with a multiple disc stack.

The invention described in this application is useful with all mechanical configurations of disc drives having either rotary or linear actuation. In addition, the invention is also useful in all types of disc drives including hard disc drives, zip drives, floppy disc drives and any other type of drives where unloading the transducer from a surface and parking the transducer may be desirable. FIG. 1 is an exploded view of one type of a disc drive 100 having a rotary actuator. The disc drive 100 includes a housing or base 112, and a cover 114. The base 112 and cover 114 form a disc enclosure. Rotatably attached to the base 112 on an actuator shaft 118 is an actuator assembly 120. The actuator assembly 120 includes a comb-like structure 122 having a plurality of arms 123. Attached to the separate arms 123 on the comb 122, are load beams or load springs 124. Load beams or load springs are also referred to as suspensions. Attached at the end of each load spring 124 is a slider 126 which carries a magnetic transducer 150. The slider 126 with the transducer 150 form what is many times called the head. It should be noted that many sliders have one transducer 150 and that is what is shown in the figures. It should also be noted that this invention is equally applicable to sliders having more than one transducer. Also attached to the load spring is a load tang 152. The load tang 152 is used for loading sliders 126 to the disc 134 and unloading the sliders 126 from the disc. On the end of the actuator arm assembly 120 opposite the load springs 124 and the sliders 126 is a voice coil 128.

Attached within the base 112 is a pair of magnets 130 and 131. The pair of magnets 130 and 131, and the voice coil 128 are the key components of a voice coil motor which applies a force to the actuator assembly 120 to rotate it about the actuator shaft 118. Also mounted to the base 112 is a spindle motor. The spindle motor includes a rotating portion called the spindle hub 133. In this particular disc drive, the spindle motor is within the hub. In FIG. 1, a number of discs 134 are attached to the spindle hub 133. In other disc drives a single disc or a different number of discs may be attached to the hub. The invention described herein is equally applicable to such other disc drives.

Moving the actuator assembly 120 moves all the load springs 124. In operation, the actuator assembly 120 is moved to a park position when the disc drive is powered down. Moving the actuator to the park position causes the sliders to move to a non-data area of the disc. The non-data area is typically at the inner diameter ("ID") of the disc 134. Once the actuator assembly 120 has moved the sliders 126 to the park position. In a drive using contact start stop, when the disc drive is powered down and the sliders land on the non-data area and skid to a halt. When the disc drive is powered on, the discs 134 are quickly accelerated until a relative velocity between the sliders 126 and the disc 134 is produced which causes the slider to lift off the surface of the disc 134. Once lift off of the slider 126 has occurred, the actuator assembly can be used to move the sliders 126 into an operating or transducing position over the area of the disc used to store information representative of data. The actuator assembly 120 can also be used to perform seeks to various data locations on the surface of the disc.

In a disc drive having a ramp, the actuator moves the transducers to the outer diameter where a ramp is positioned. A portion of the actuator assembly contacts the ramp resulting in the sliders being unloaded from the disc. When operations resume, the actuator is moved toward the disc. The sliders and transducers are placed in transducer relation to the disc or is loaded onto the disc.

Figure 2:
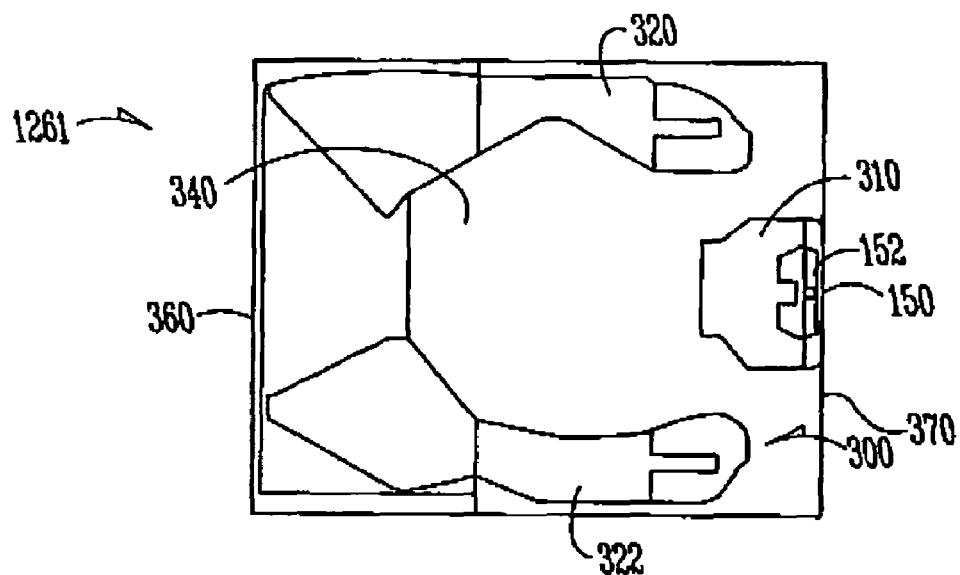
FIG. 2 is a bottom view of a slider showing the air-bearing surface of a prior art slider.

FIG. 2 is a bottom view of a slider 126 showing an air-bearing surface 300. The air-bearing surface includes a center island 310, a first side rail 320 and a second side rail 322. The air-bearing surface 300 includes contact portions which contact the disc 134 during take-off and landing of the slider 126 and noncontact portions which do not normally contact the disc 134. The center island 310 and side rails 320 and 322 are contact portions. A single-level cavity 340 is typically formed between the side rails 320 and 322 as well as the center island 310. The single-level cavity 340 is a noncontact portion of the air-bearing surface 300. The slider also has a leading edge 360 and a trailing edge 370. Positioned at or near the trailing edge 370 is the transducer 150. As shown in FIG. 2, the transducer fits within a slot 152 within the center island 310.

Figure 3:
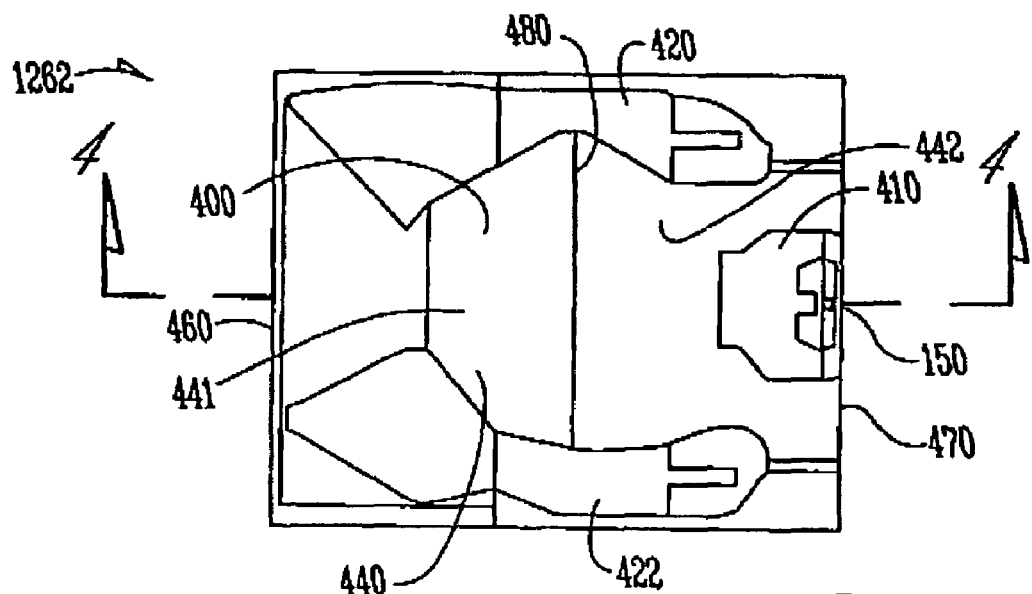
FIG. 3 is a bottom view of a slider of the present invention wherein the cavity between the rails has at least two levels.
Figure 4:
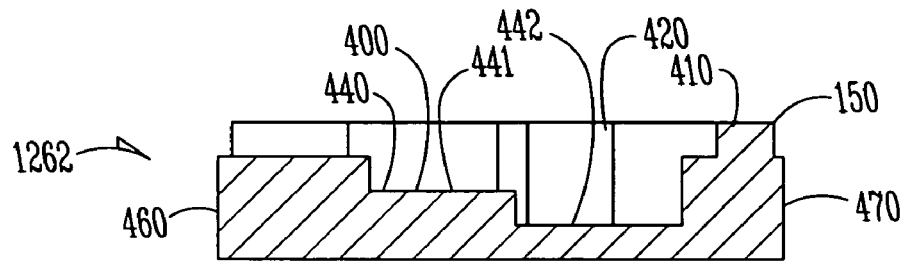
FIG. 4 is a cutaway side view of the slider along line 4-4 of the slider air-bearing surface shown in FIG. 3.

FIG. 3 is a bottom view of a slider 126 which has an air-bearing surface 400 in accordance with this invention. In FIG. 4, the slider 126 has an air-bearing surface with the side rails 420 and 422. The air-bearing surface 400 shown in FIG. 4 includes a center island portion 410. A bi-level cavity or depression 440 is formed between the first rail 420 and the second rail 422. The bi-level cavity or depression 440 includes a first surface 441 which is at a first distance from the surface of the first rail 420 and the surface of the second rail 422. The bi-level cavity 440 also includes a second surface 442 which is at a second distance from the surface of the first rail 420 and the surface of the second rail 422 of the air-bearing surface 400. The first surface 441 and the second surface 442 are at different distances from the first and second rails 420, 422, respectively. The first surface 441 and the second surface 442 are separated by a wall 480. The wall 480 may also be said to form the cavity portion 440 into a first cavity having a first surface 441 and into a second cavity or depression having a second surface 442.

The first rail 420 and the second rail 422 form the contact portion of the air-bearing surface 400. The air-bearing surface 400 also includes a leading edge 460 and a trailing edge 470. A transducer 150 is positioned near the trailing edge 470 of the slider 126 and at or near the surface of the first rail 420. The leading edge 460 may include a leading edge taper on the first side rail 420 and a leading edge taper on the second side rail 422.

As can be seen by looking at FIGS. 3 and 4, the air-bearing surface 400 includes a bi-level cavity having a first surface 441 in a first cavity and a second surface 442 in a second cavity. The two surfaces are separated by a wall which is a thin transversal wall 480, also known as a suction divider, which contains the suction forces in each of the regions or near each of the surfaces 441, 442. The surface level 441 near the leading edge 460 is shallower or less deep than the surface level 442 near the trailing edge 470 of the slider 126. The reason for the different levels of the surfaces 441, 442 is that this produces a suction force which is higher at the surface or at the cavity formed by the surface 442 near the trailing edge when compared to the suction force produced by the cavity or surface 441 near the leading edge. The result is that the total suction force produced by both surfaces 441, 442 is biased or moved toward the trailing edge 470 of the slider 126 by moving the suction force to position closer to the trailing edge 470. When the suction force is positioned more toward the center or biased toward the trailing edge it has been found that the altitude sensitivity is lessened.

Figure 5:
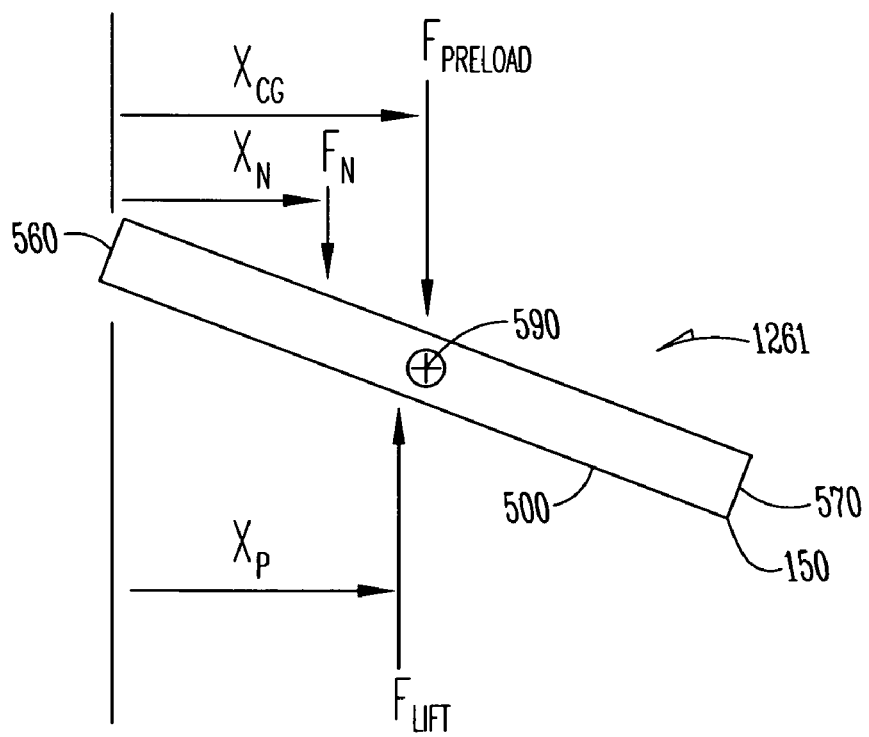
FIG. 5 is a free body diagram of a slider showing various forces which act on the slider which affect the pole tip fly height of the transducer.

Turning now to FIG. 5, which is a schematic side view of a slider showing the various forces acting on the slider, this will be explained in further detail. As shown in FIG. 5, the slider 126 has an air-bearing surface 500, a leading edge 560 and a trailing edge 570. The transducer 150 and specifically the pole tip of the transducer 150 is located near the bottom of the trailing edge 570 which is closest to the air-bearing surface 500. FIG. 5 is a schematic so the details of the air-bearing surface 500 are not detailed so that the details are generalized to all types of air-bearing surfaces discussed with respect to this invention. The slider 126, shown in FIG. 5, has several forces which act upon the slider during its operation. When the slider actually flies or passes over a disk 134, these particular forces act against one another and equilibrate to determine the fly height as well as the angle at which the slider 126 flies with respect to the disc 134. As shown in FIG. 5, the force of the preload acts essentially at a distance through the center of gravity of the slider 126. The lift force $F_{lift}$, acts slightly ahead of the center of gravity at a distance $X_p$ from the leading edge 560 of the slider. The suction force, denoted $F_n$, generally acts at a distance $X_n$, which is between the distance $X_{cg}$, or the distance to the center of gravity and the leading edge 560. Since $F_n$ is positioned away from the center of gravity of the slider 126, it produces a torque around the center of gravity 590 of the slider 126. Torque is equal to force at a distance and therefore the greater the distance from the center of gravity 590 where the force $F_n$ is applied as well as the higher the level of force, the higher the level of torque produced. Thus, it can be seen when the suction force $F_n$ is located toward the leading edge and away from the center of gravity or toward the leading edge 560 and away from the center of gravity 590 of the slider, a torque is produced. Given the fact that the suction force will be essentially the same by moving it toward the trailing edge 570 and thereby toward the center of gravity 590, the amount of torque produced by the suction force $F_n$ is reduced. As a result, the slider 126 is less prone to rotate due to a torque produced by the suction force $F_n$ when the suction force is moved toward the center of gravity 590 and toward the trailing edge. Thus, when the suction force is lost or reduced such as when the velocity between the slider 126 and the disc 134 is reduced, there will not be a large rotation at the trailing edge 570, and therefore there will not be a large variation in the pole tip fly height of the transducer 150, which is positioned at the air-bearing surface 500 of the slider 126 near or at the trailing edge 570 of the slider 126. In essence, by forming two surfaces 441, 442 which are divided by the suction wall 480, the force $F_n$ can be moved more toward the trailing edge 570 and also more toward the center of gravity 590 within the slider so as to lessen the effects of a loss of torque due to a loss in suction force during the operation of the slider 126. In other words, if the torque produced by the suction force $F_n$ is less for a given suction force $F_n$, then a corresponding torque which has to counteract the torque produced by $F_n$ is also less and a loss of suction force does not cause the corresponding torque to act and move the transducer with respect to the disc 134. Thus, the closer you can move the suction force $F_n$ toward the center of gravity 590 of the slider 126, the less torque or rotational moment that is produced and therefore the less counter rotation that will be seen as a result of a loss of the suction force $F_n$. Thus, by moving the area where the suction force $F_n$ applied toward the center of gravity 590 of the slider 126, there will be less fluttering or variance of the transducer 150 at the trailing edge 570 of the slider 126. It should also be noted that the placement of the suction force $F_n$ can be varied by varying both the surface area of the first surface 441 and the second surface 442 as well as the depths of these with respect to the side rails 420 and 422. By varying both the surface area, the size of the surface, and the depth, the suction force $F_n$ can be moved to a desired position closer to the center of gravity 590, or closer to the trailing edge 570.

Figure 6:
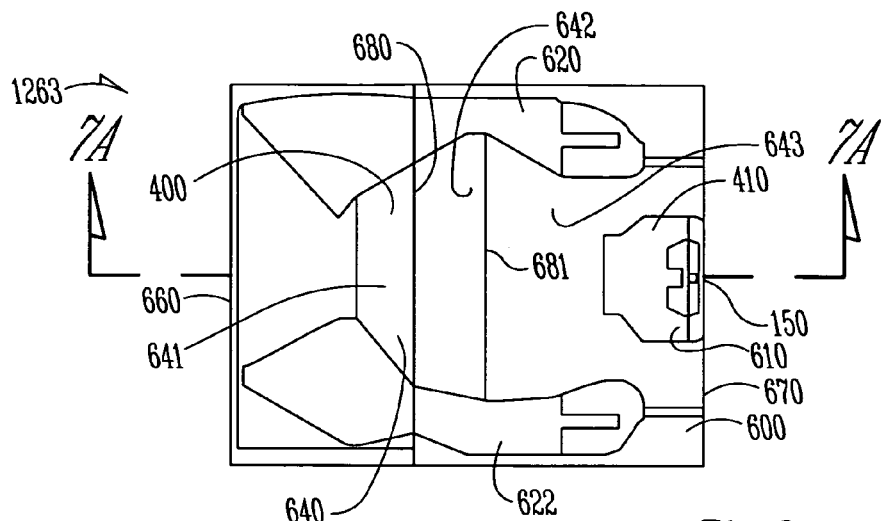
FIG. 6 is a bottom view of another embodiment of a slider air-bearing surface according to this invention.
Figure 7:
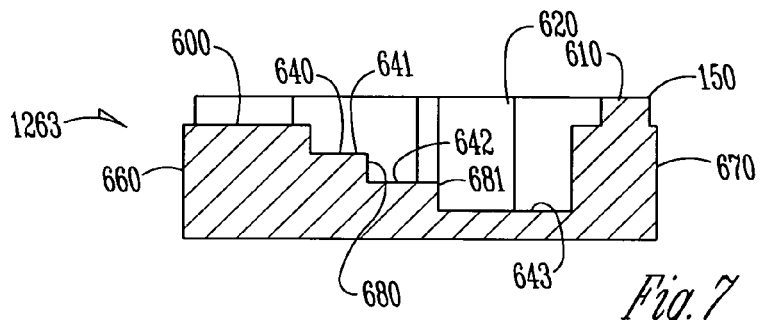
FIG. 7 is a cutaway side view along line 7-7 of the slider air-bearing surface shown in FIG. 6.
Figure 10:
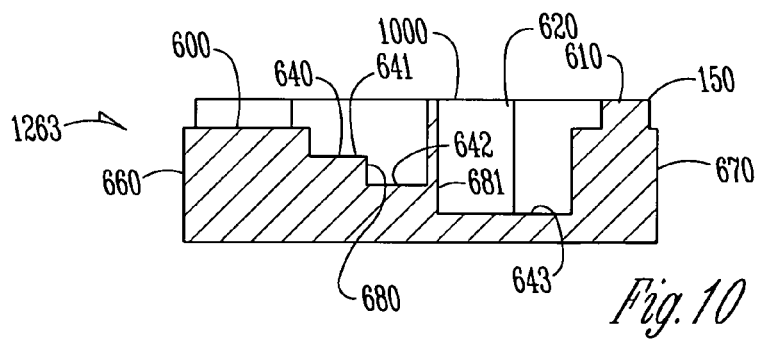
FIG. 10 is a cross-sectional view of a slider having a suction divider wall which extends from the cavity to the ABS level.
Figure 11:
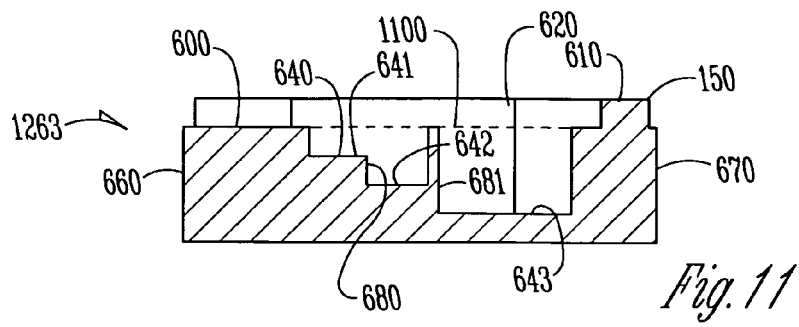
FIG. 11 is a cross-sectional view of a slider having a suction divider wall which extends from the cavity to the step level.

Of course, it should be noted that a bi-level or two-level cavity is not the only embodiment contemplated by this invention. FIGS. 6 and 7 show a slider 126 which has as an air-bearing surface 600 with a cavity 640, which is positioned between a first side rail 620 and a second side rail 622. The cavity or depression includes three levels or three surfaces, 641, 642, and 643, which are at varying depths with respect to the surfaces of the side rail 620 and 622. Each of the surfaces 641 and 642, as well as 642 and 643, are divided by suction divider walls 680 and 681. Again, the size of the surfaces 641, 642, 643 can be varied as well as the depth of each surface with respect to the other surfaces can also be varied to move or control exactly where the suction force $F_n$ (see FIG. 5) acts upon the slider. Note that suction divider walls 680, 681 are not necessary. If used, suction divider walls 680, 681 raise up to ABS level or the step level. The suction divider walls can also vary in thickness, depending on the amount of separation needed. Any combination of ABS level suction divider wall, step level wall and no wall are possible. The various combinations used vary the placement of where the suction force $F_n$ (see FIG. 5) acts on the slider. FIG. 10 shows a suction divider wall 680 extending to the ABS level 1000 and FIG. 11 shows a suction divider wall 680 which extends to the step level 1100 of the slider. Again, the depth of the suction divider wall can be varied to control the placement of the suction force $F_n$ (see FIG. 5).

Of course, it should be clear that any number of compartments or surfaces are contemplated even though the embodiment shown in FIGS. 6 and 7 shows only three different compartments or cavities or depressions within the air-bearing surface. More could also be used.

Figure 8:
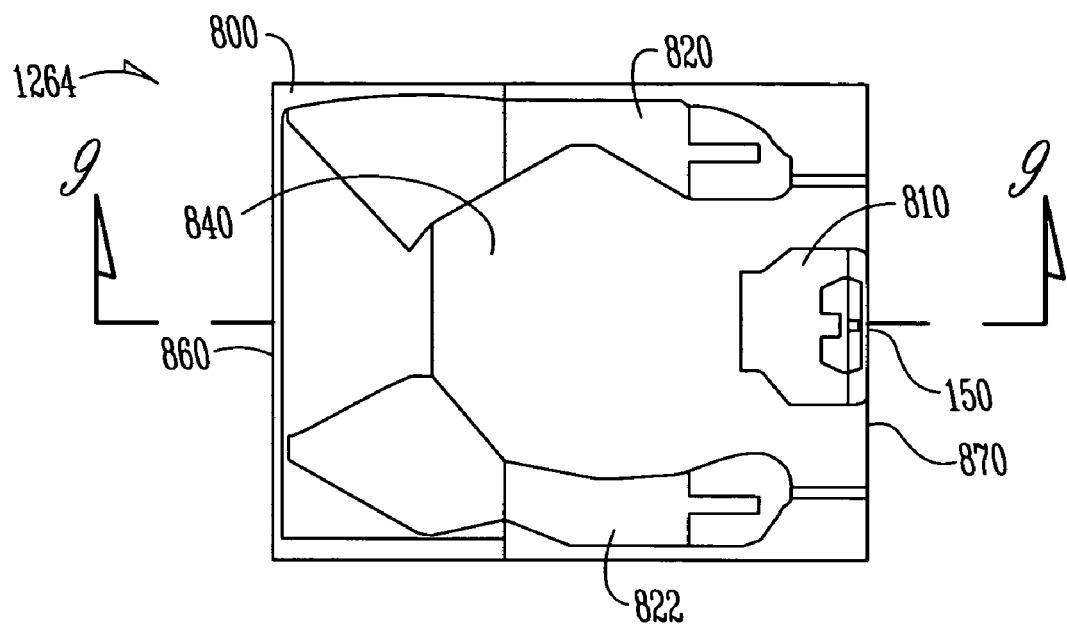
FIG. 8 is a bottom view of another embodiment of the slider air-bearing surface in accordance with this invention.
Figure 9:
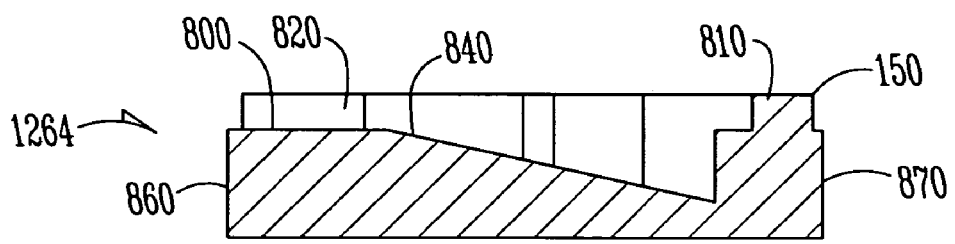
FIG. 9 is a cutaway side view of the slider air-bearing surface along line 9-9 in FIG. 8.

Yet another embodiment is shown in FIGS. 8 and 9. In FIG. 8, there is a slider 126 shown having a leading edge 860 and a trailing edge 870, as well as an air-bearing surface 800. The air-bearing surface includes a first rail 820 and a second rail 822. The depression or cavity is positioned between the side rails 822 and 820 and before the center island 810 and the leading edge 860. In this particular instance, the cavity or depression 840 includes a sloping surface. In other words, the cavity slopes with respect to the air-bearing surface 800 and specifically slopes with respect to the surfaces of the side rails 820 and 822. The slope of the cavity 840 is from a shallow distance or a smaller distance near the leading edge 860 toward a deeper depth or distance with respect to the surfaces of the side rails 820, 822 near the trailing edge 870 of the slider 126. In this particular instance, the amount of slope can be selected in order to move the position at which the suction force, $F_n$ (shown in FIG. 5), acts upon the slider 126. Although no suction walls are shown in FIGS. 8 and 9, it is contemplated that suction walls could be used to compartmentalize the areas where suction will be produced.

Advantageously, slider having an air-bearing surface with at least two levels within the cavity or depression allows for an apparatus for controlling the amount of fly height variance associated with the slider. Since the fly height variance is controlled, the incidence of contact between the slider and the disc surface can be also be controlled. In other words, the slider air-bearing design having at least a two level cavity or depression has low altitude sensitivity when properly optimized. The design also allows for controlling the location of the suction force center where the suction force acts on the slider. In addition, this is achieved without decreasing lift and suction magnitude, which would, possibly, degrade other performance characteristics such as bearing stiffness and manufacturing sensitivity.

Figure 12:
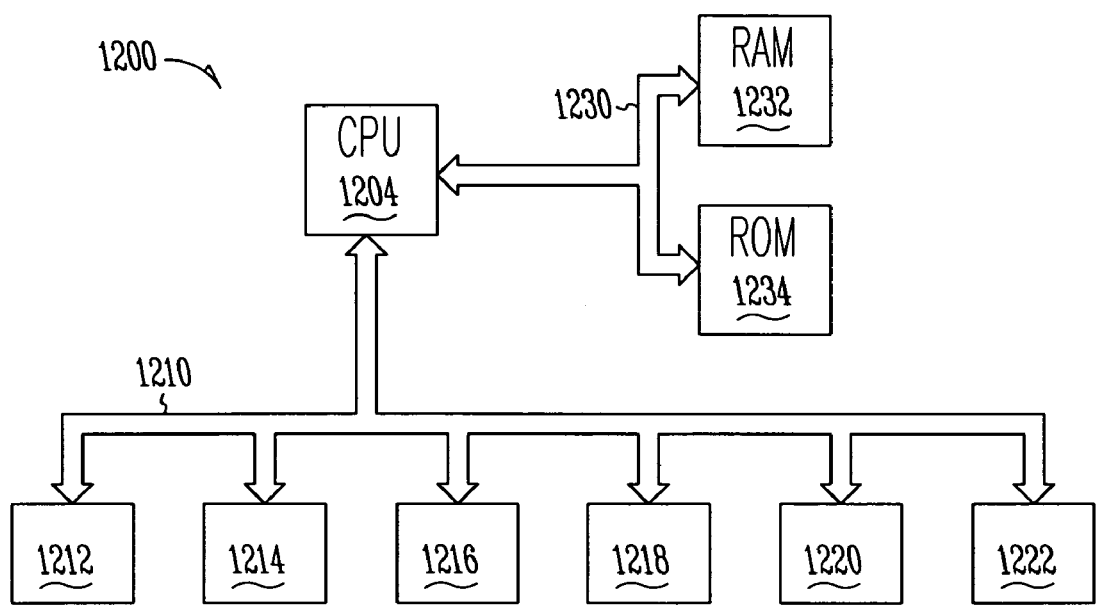
FIG. 12 is a schematic view of a computer system.

FIG. 12 is a schematic view of a computer system. Advantageously, the invention is well-suited for use in a computer system 1200. The computer system 1200 may also be called an electronic system or an information handling system and includes a central processing unit, a memory and a system bus. The information handling system includes a central processing unit 1204, a random access memory 1232, and a system bus 1230 for communicatively coupling the central processing unit 1204 and the random access memory 1232. The information handling system 1202 includes a disc drive device which includes the ramp described above. The information handling system 1202 may also include an input/output bus 1210 and several devices peripheral devices, such as 1212, 1214, 1216, 1218, 1220, and 1222 may be attached to the input output bus 1210.

Peripheral devices may include hard disc drives, magneto optical drives, floppy disc drives, monitors, keyboards and other such peripherals. Any type of disc drive may use the slider having the surface treatment discussed above.

CONCLUSION

A slider 126 for a disc drive 100 includes an air-bearing surface 400, 600, 800 which has a first rail, a second rail, and a cavity 440, 640, 840 positioned between the first rail and the second rail. The cavity has a first level surface 441, 641 and a second level surface 442, 642. The first level surface 441, 641 is at a different distance from a surface of the first rail 420 than the second level surface 442, 642. The air-bearing surface 400, 600 also has a divider 480, 680 between the first level surface 441, 641 and the second level surface 442, 642. The divider 480, 680 extends to the level of the first rail 420, 620. In one embodiment, the air-bearing surface 400, 600 of the slider 126 includes a third level surface 643. The air-bearing surface may include a first divider 680 between the first level surface 641 and the second level surface 642, and a second divider 681 positioned between the second level surface 642 and the third level surface 643. In another embodiment, the cavity 840 between the first rail 820 and the second rail 822 slopes to provide a cavity 840 having a first surface level and the second surface level. The slope of the cavity surface 840 slopes with respect to a surface of the first rail 820. The slope can be varied to control the location at which a suction force acts on the slider. In the alternative, the area of the first level surface 441, 641 and the area of the second level surface 442, 642 can be varied to control the location at which a suction control force acts on the slider 126. The depth of the first level surface 441, 641 and the depth of the second level surface 442, 642 can also be varied to control the location at which a suction control force acts on the slider 126. In other words, both the area and depth of the first level surface 441, 641 and the area and depth of the second level surface 442, 642 can be varied to control the location at which a suction control force acts on the slider 126.

A disc drive 100 includes a base 112, a disc 134 rotatably attached to the base 112, and an actuator attached to the base 112. The base also includes a slider having an air-bearing surface 400, 600, 800. The air-bearing surface 400, 600, 800 includes a first rail 420, 620, 820, a second rail 422, 622, 822 and a depression 440, 640, 840 positioned between the first rail 420, 620, 820 and the second rail 422, 622, 822 of the air-bearing surface 400, 600, 800. The depression further includes a first level surface 441, 641 and a second level surface 442, 642. The first level surface 441, 641 of the slider 126 is at a different distance from a surface of the first rail 420, 620 of the slider 126 than the second level surface 442, 642 of the slider 126. The air-bearing surface 400, 600 may also include a divider 480, 680 located between the first level surface 441, 641 of the slider and the second level surface 442, 642 of the slider. The divider 480, 680 extends to the level of the first rail 420, 620 of the slider 126. In some embodiments, the air-bearing surface 400, 600 of the slider 126 may further include a third level surface 643 and a second divider 681 positioned between the second level surface 642 of the slider 126 and the third level surface 643 of the slider 126. The location where the suction control force acts on the slider 126 can be controlled by varying the area of the first level surface 441, 641 of the slider and the area of the second level surface 442, 642 of the slider 126.

Most generally, a slider 126 for a disc drive information handling system includes a transducer 150 associated with the slider 126, and an air-bearing surface 400, 600, 800 further comprising an apparatus 440, 640, 840 for controlling the amount of fly height variance associated with the slider 126.

It is to be understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A slider comprising:
   a first rail;
   a second rail;
   at least one negative pressure cavity positioned between the first rail and second rail, the cavity having a proximal and distal end, the cavity further comprising:
   a first surface extending between the first and second rail and positioned in the proximal end of the cavity; and
   a second surface extending between the first and second rail and positioned adjacent the first surface in the cavity, wherein the second surface is recessed from the first surface and the first and second surfaces are recessed from an air-bearing surface.

2. The slider of claim 1, wherein the slider further comprises a leading edge, a trailing edge, and a cross rail, wherein the cross rail extends between the first and second rail proximate the leading edge.

3. The slider of claim 2, wherein the slider further comprises a center island portion between the first and second rail proximate the trailing edge.

4. The slider of claim 2, wherein the cavity further comprises a third surface extending between the first and second rail.

5. The slider of claim 4, wherein the third surface is recessed from the second surface.

6. The slider of claim 4, further comprising a first divider positioned between the second surface and the third surface.

7. The slider of claim 6, wherein the first divider extends to a level of the cross rail.

8. The slider of claim 6, wherein the first divider extends to a level of the air bearing surface.

9. The slider of claim 1 further comprising a center of gravity.

10. The slider of claim 9, wherein the first and second surface each comprise a depth, the depth being measured from the air bearing surface, wherein the depth is varied to position the first and second surface proximate the center of gravity.

11. The slider of claim 9, wherein the first and second surface each comprise a surface area, wherein the surface area is varied to position the first and second surface proximate the center of gravity.

12. The slider of claim 9, wherein the first and second surface each comprise a surface size, wherein the surface size is varied to position the first and second surface proximate the center of gravity.

13. A slider comprising:
    a center of gravity;
    a first and second rail; and
    a negative pressure cavity positioned between the first and second rail, said cavity having a first surface and a second surface, wherein the first and second surfaces are positioned such that a suction force generated by the cavity is proximate the center of gravity.

14. The slider of claim 13, wherein the slider, further comprises a leading edge, a trailing edge, and a cross rail, wherein the cross rail extends between the first and second rail proximate the leading edge.

15. The slider of claim 14, wherein the slider further comprises a center island portion positioned between the first and second rail proximate the trailing edge.

16. The slider of claim 13, wherein the cavity further comprises a third surface extending between the first and second rail.

17. The slider of claim 16, wherein the third surface is recessed from the second surface.

18. The slider of claim 16, further comprising a first divider between the second surface and the third surface.

19. The slider of claim 13, wherein the first and second surface each comprise a depth, the depth being measured from the air bearing surface, wherein the depth is varied to position the first and second surface proximate the center of gravity.

20. The slider of claim 13, wherein the first and second surface each comprise a surface area, wherein the surface area is varied to position the first and second surface proximate the center of gravity.

21. The slider of claim 13, wherein the first and second surface each comprise a surface size, wherein the surface size is varied to position the first and second surface proximate the center of gravity.

* * * * *